UNITED STATES PATENT OFFICE.

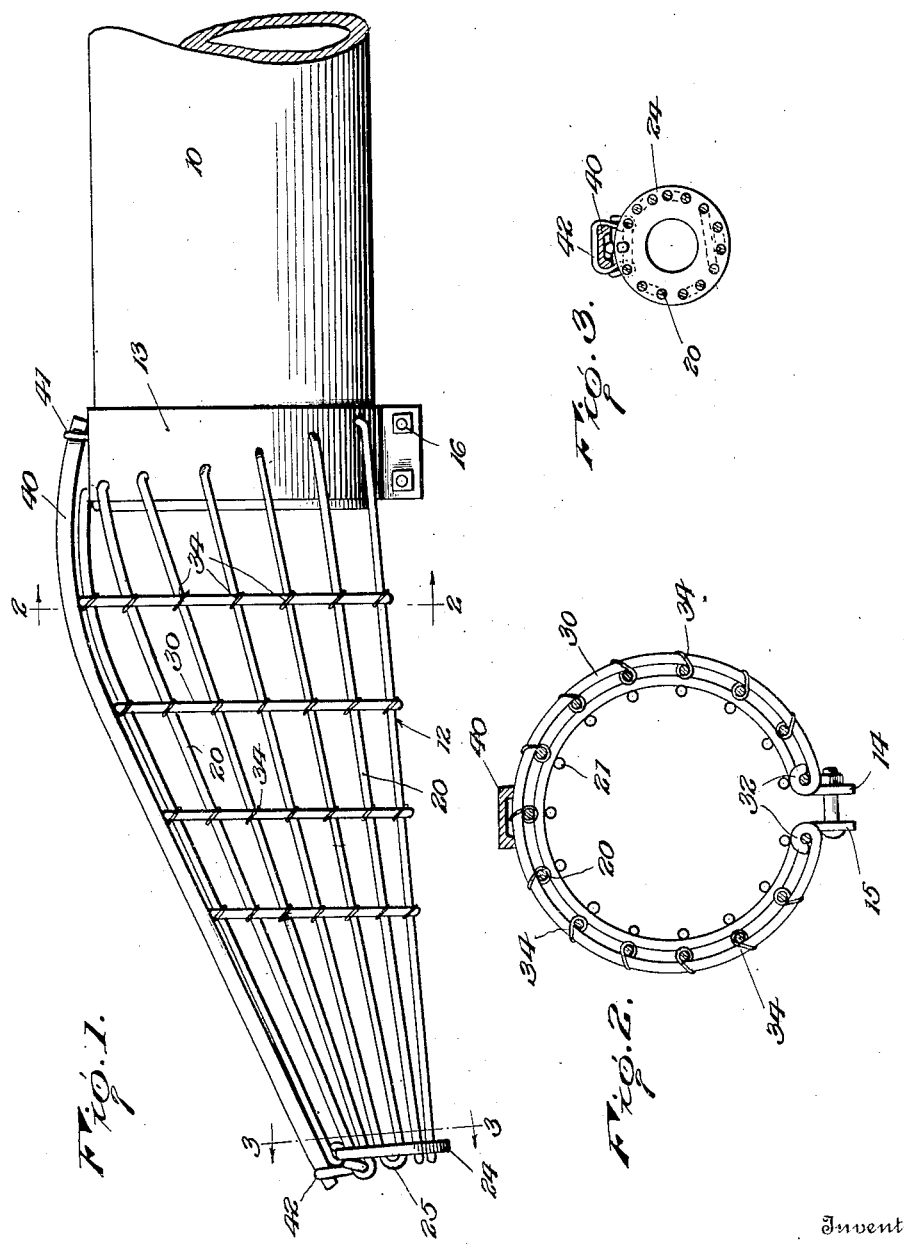

LUMAN H. BRADBURN, OF EUREKA, MONTANA.

PIPE-PROTECTOR.

1,371,143.   Specification of Letters Patent.   Patented Mar. 8, 1921.

Application filed April 20, 1920. Serial No. 375,233.

*To all whom it may concern:*

Be it known that I, LUMAN H. BRADBURN, a citizen of the United States, residing at Eureka, in the county of Lincoln and State of Montana, have invented certain new and useful Improvements in Pipe-Protectors, of which the following is a specification.

This invention relates to improvements in protectors adapted for use in connection with drain or irrigation pipes.

An important object of this invention is to provide a protector which may be readily applied to the inlet or outlet end of a drain or irrigation pipe so as to prevent such foreign matter as sticks, rocks, or vermin from entering the pipe.

A further object of this invention is to provide a protector for drain or irrigation pipes having novel means whereby foreign matter upon approaching the entrance of the pipe will be directed laterally of the same and in such a manner that the pipe will not be clogged as the result of a collection of foreign matter at the entrance end thereof.

A further object of the invention is to provide a protector for drainage or irrigation pipes which is curved longitudinally to some extent to allow the protector to be connected to the pipe at a bend in the ditch or trench in which the pipe is arranged.

A further object of the invention is to provide a protector for drainage or irrigation pipes which may be readily adjusted for attachment to pipes of various sizes.

Other objects and advantages of the invention will be apparent during the course of the following description.

In the accompanying drawing forming a part of this application and in which like numerals are employed to designate like parts throughout the same, Figure 1 is a side elevation of the improved protector applied, Fig. 2 is a vertical transverse section taken on line 2—2 of Fig. 1, Fig. 3 is a vertical transverse section taken on line 3—3 of Fig. 1.

In the drawing wherein for the purpose of illustration is shown a preferred embodiment of the invention, the numeral 10 designates one end portion of a drain or irrigation pipe and for the purpose of this specification it will be assumed that the portion of the pipe illustrated is the inlet end portion of an irrigation pipe which is arranged in a ditch or stream so as to convey a quantity of water to a desired point of use.

The improved guard or protector which is generally designated by the numeral 12, comprises a split attaching collar 13 having its end portions extended outwardly to form ears 14 and 15. As illustrated in Figs. 1 and 2, the ears 14 and 15 are formed with apertures through which are extended fastening bolts 16 adapted for securely engaging the collar with the inlet end portion of the irrigation pipe.

The body of the improved guard comprises a plurality of lengths of wire 20 having their end portions 21 extended through and bent upon the inner side of the collar 13 and their intermediate portions engaged with a head 24 in the form of a flat disk. In bending the intermediate portions of the wires 20 upon themselves, semi-circular loops 25 are formed and said loops engage the head 24 so that the head is effectively secured in position and so that the wires are properly spaced. With particular reference to Figs. 1 and 2, it will be noted that the end portions of the wires 20 are connected to the collar on an oblique line so that the body of the guard is inclined downwardly and gradually tapered in the direction of its free end. The wires 20 which extend lengthwise of the device are positioned in spaced relation and reinforced by a plurality of split loops 30 having their end portions hooked about the lowermost wires, as indicated at 32. At the points that the reinforcing wires or loops 30 intersect the wires 20, suitable fastening devices 34, such as short lengths of wire, connect the same. A longitudinally curved shield 40 of elongated formation is arranged upon the upper side of the body and has one end portion rigidly secured to the collar by a fastening loop 41 and its other end secured to one of the semi-circular loops 25 by a fastening device 42. The shield 40 which, as illustrated in Fig. 2, has its outer face flat, serves as an efficient means for deflecting such foreign matter as sticks, rocks and vermin laterally of the intake end of the pipe, as such matter approaches the pipe.

By reason of the fact that the shield 40 is arranged upon the top of the body and since the body is tapered to a point, foreign matter will not be allowed to remain about the body but will be forced laterally of the same. Also the tapered formation of the body causes stones and the like thrown at the body to be deflected from the same without damage to the device.

In applying the improved protector, the collar 13 is securely engaged with one end of the pipe in such a manner that the shield 40 is arranged upwardly. It will be noted with reference to Fig. 1 that the device may be connected to a pipe at the bend or curve in the stream or ditch by partly turning the device upon its side and securing the collar 13 to the pipe. In this manner the foraminous body will accommodate itself to the bend in the ditch or stream.

With reference to the foregoing description it will be noted that a pipe protector constructed in accordance with this invention effectively excludes foreign matter from entering irrigation and drain pipes and also prevents the excessive accumulation of foreign matter at the entrance end of the pipe, so that the pipe will not in time be clogged as the result of collection of foreign matter at the entrance thereof.

It is to be understood that the form of the invention herewith shown and described is to be taken as a preferred embodiment of the same and that such minor changes in construction and arrangement of parts may be made as will remain within the spirit of the invention and the scope of what is claimed.

Having thus described the invention, what is claimed as new is:

1. A device of the class described comprising an attaching member, a plurality of wires connected to said attaching member on an oblique line whereby said wires are converged from said attaching member, a head connected to said wires, and a plurality of spaced reinforcing wires surrounding said first named wires and connected to the same.

2. A device of the class described comprising an attaching member, a foraminous body carried by said attaching member and being pointed toward its free end, and a shield extending along the side of the foraminous body.

3. A protector for pipes comprising an attaching member, a foraminous body connected to said attaching member, and a reinforcing strip extending along one side of the body and being curved longitudinally for deflecting foreign matter from the body.

4. A device of the class described comprising an attaching member, a foraminous body carried by said attaching member and having one side curved longitudinally whereby the body is gradually tapered in the direction of its free end, and a shield arranged at one side of the body.

5. A device of the class described comprising an attaching member, a plurality of wires having their end portions secured to said attaching member and their intermediate portions formed with semi-circular loops, a head engaged with the semi-circular loops of said wires, and a shield extending lengthwise of said wires.

6. A device of the class described including an attaching member, a plurality of wires of equal lengths having their end portions secured to said attaching member and their intermediate portions formed with semi-circular loops, a head connected to said semi-circular loops, said wires being connected to said attaching member on an oblique line whereby said wires converge in the direction of said head.

7. A device of the class described comprising an attaching member, a plurality of wires arranged in spaced relation and having their end portions secured to said attaching member, a head connected to said wires, a shield extending lengthwise over said wires and connected to one of said wires, said shield being curved longitudinally for deflecting foreign matter laterally of said wires, and a plurality of reinforcing wires connecting said first-named wires.

In testimony whereof I affix my signature.

LUMAN H. BRADBURN. [L. S.]